United States Patent
Suzuki et al.

(10) Patent No.: US 10,600,439 B2
(45) Date of Patent: Mar. 24, 2020

(54) MAGNETIC TAPE, MANUFACTURING METHOD OF MAGNETIC TAPE, MANUFACTURING DEVICE OF MAGNETIC TAPE, AND RECORDING AND REPRODUCING SYSTEM

(71) Applicant: FUJIFILM CORPORATION, Minato-ku, Tokyo (JP)

(72) Inventors: Hodaka Suzuki, Kanagawa (JP); Yoichi Akano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/296,214

(22) Filed: Mar. 7, 2019

(65) Prior Publication Data

US 2019/0287561 A1   Sep. 19, 2019

(30) Foreign Application Priority Data

Mar. 13, 2018   (JP) .................................. 2018-045694

(51) Int. Cl.
| | | |
|---|---|---|
| *G11B 5/584* | (2006.01) | |
| *G11B 5/65* | (2006.01) | |
| *G11B 21/02* | (2006.01) | |
| *G11B 5/78* | (2006.01) | |
| *G11B 5/714* | (2006.01) | |
| *G11B 5/706* | (2006.01) | |

(52) U.S. Cl.
CPC .......... *G11B 5/653* (2013.01); *G11B 5/70678* (2013.01); *G11B 5/714* (2013.01); *G11B 5/78* (2013.01); *G11B 21/02* (2013.01)

(58) Field of Classification Search
CPC . G11B 5/00817; G11B 5/00826; G11B 5/265; G11B 5/584; G11B 5/59628; G11B 15/087; G11B 2220/956; G11B 15/0087
USPC .................................... 360/48, 77.12, 71, 75
See application file for complete search history.

(56) References Cited

U.S. PATENT DOCUMENTS

| | | | |
|---|---|---|---|
| 8,107,186 B2* | 1/2012 | Bui .................... | G11B 5/00878 360/48 |
| 8,139,312 B2* | 3/2012 | Bui ........................ | G11B 5/584 360/77.12 |
| 9,123,354 B2* | 9/2015 | Cherubini .......... | G11B 5/00826 |

(Continued)

FOREIGN PATENT DOCUMENTS

| | | |
|---|---|---|
| JP | 2005-317179 A | 11/2005 |
| JP | 2005-327386 A | 11/2005 |
| JP | 2014-199706 A | 10/2014 |

*Primary Examiner* — Nabil Z Hindi

(74) *Attorney, Agent, or Firm* — Solaris Intellectual Property Group, PLLC

(57) ABSTRACT

Provided is a magnetic tape, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, the magnetic tape is used in a recording and reproducing system which uses a reproducing element for reproducing the servo pattern, a width of which satisfies W1≤(1/tan θ)×stripe width T of the servo pattern, and the angle θ is greater than 25° and equal to or smaller than 45°.

18 Claims, 13 Drawing Sheets

(56) References Cited

U.S. PATENT DOCUMENTS

2010/0079890 A1* 4/2010 Brummet ............... G11B 5/584
360/40
2015/0318006 A1* 11/2015 Cherubini ............... G11B 5/584
360/71
2015/0318008 A1* 11/2015 Cherubini .......... G11B 20/1201
360/48

* cited by examiner

| θ [°] | T [μm] | (1/tan θ) × T [μm] | WIDTH W [μm] | SERVO SIGNAL OUTPUT% WITH RESPECT TO θ 12° | (0.5/tan θ) × T [μm] | WIDTH W [μm] | SERVO SIGNAL OUTPUT% WITH RESPECT TO θ 12° |
|---|---|---|---|---|---|---|---|
| 26 | 0.3 | 0.62 | 0.6 | 76% | 0.31 | 0.3 | 94% |
|  | 0.6 | 1.23 | 1.2 | 72% | 0.62 | 0.6 | 94% |
|  | 1.2 | 2.46 | 2.4 | 72% | 1.23 | 1.2 | 93% |
| 36 | 0.3 | 0.41 | 0.35 | 75% | 0.21 | 0.2 | 91% |
|  | 0.6 | 0.83 | 0.8 | 68% | 0.41 | 0.35 | 93% |
|  | 1.2 | 1.65 | 1.6 | 68% | 0.83 | 0.8 | 91% |
| 45 | 0.3 | 0.30 | 0.3 | 65% | 0.15 | 0.15 | 90% |
|  | 0.6 | 0.60 | 0.6 | 65% | 0.30 | 0.3 | 90% |
|  | 1.2 | 1.20 | 1.2 | 65% | 0.60 | 0.6 | 90% |

FIG. 6

| | | | | | | |
|---|---|---|---|---|---|---|
| SERVO FORMAT | ANGLE $\theta$ [°] | 12 | 26 | 36 | 45 | 45 |
| | STRIPE INTERVAL [$\mu$m] | 2.4 /1.2 /0.8 | 2.4 /1.2 /0.8 | 2.4 /1.2 /0.8 | 2.4 /1.2 /0.8 | 2.4 /1.2 /0.8 |
| | NUMBER OF STRIPES | 4 /8 /12 | 4 /8 /12 | 4 /8 /12 | 4 /8 /12 | 4 /8 /12 |
| | STRIPE WIDTH [$\mu$m] | 1.2 /0.6 /0.4 | 1.2 /0.6 /0.4 | 1.2 /0.6 /0.4 | 1.2 /0.6 /0.4 | 1.2 /0.6 /0.4 |
| | SERVO BAND HEIGHT [$\mu$m] | 96 | 15 | 15 | 50 | 50 |
| | SUBFRAME LENGTH [$\mu$m] | 78 | 51 | 51 | 100 | 100 |
| MEDIUM | KIND OF MAGNETIC BODY | BaFe | BaFe | BaFe | BaFe | SrFe |
| | PARTICLE VOLUME [nm$^3$] | 1800 | 1800 | 1800 | 1800 | 995 |
| | VERTICAL DIRECTION SQUARENESS RATIO | 0.55 | 0.55 | 0.55 | 0.55 | 0.53 |
| | LONGITUDINAL DIRECTION SQUARENESS RATIO | 0.4 | 0.4 | 0.4 | 0.4 | 0.33 |
| REPRODUCING ELEMENT WIDTH [$\mu$m] | | 0.35 | 0.35 | 0.35 | 0.1 | 0.1 |

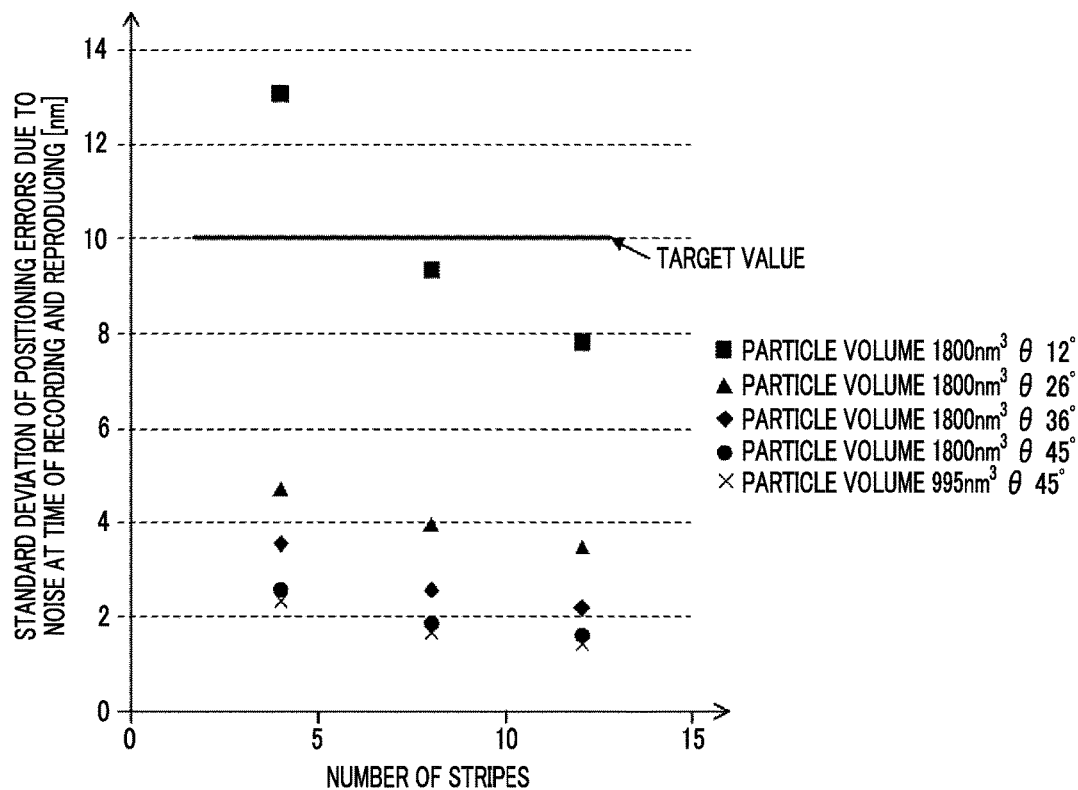

| WIDTH W [μm] | θ [°] | KIND OF MAGNETIC POWDER | VOLUME [nm³] | STANDARD DEVIATION OF POSITIONING ERRORS [nm] | |
|---|---|---|---|---|---|
| | | | | NUMBER OF STRIPES IS 4 | NUMBER OF STRIPES IS 8 |
| 0.35 | 36 | METAL | 2850 | 4.2 | 2.9 |
| 0.35 | 36 | BaFe | 1900 | 3.3 | 2.3 |
| 0.35 | 36 | SrFe | 1400 | 2.8 | 2.0 |
| 0.35 | 36 | SrFe | 1350 | 2.9 | 2.0 |
| 0.35 | 36 | SrFe | 1122 | 2.6 | 1.9 |
| 0.35 | 36 | SrFe | 995 | 2.5 | 1.8 |
| 0.35 | 26 | METAL | 2850 | 6.6 | 4.7 |
| 0.35 | 26 | BaFe | 1900 | 5.2 | 3.7 |
| 0.35 | 26 | SrFe | 1400 | 4.5 | 3.2 |
| 0.35 | 26 | SrFe | 1350 | 4.6 | 3.3 |
| 0.35 | 26 | SrFe | 1122 | 4.3 | 3.0 |
| 0.35 | 26 | SrFe | 995 | 4.1 | 2.9 |
| 0.35 | 12 | METAL | 2850 | 13.9 | 9.8 |
| 0.35 | 12 | BaFe | 1900 | 11.0 | 7.8 |
| 0.35 | 12 | SrFe | 1400 | 9.5 | 6.7 |
| 0.35 | 12 | SrFe | 1350 | 9.7 | 6.8 |
| 0.35 | 12 | SrFe | 1122 | 9.0 | 6.4 |
| 0.35 | 12 | SrFe | 995 | 8.6 | 6.1 |

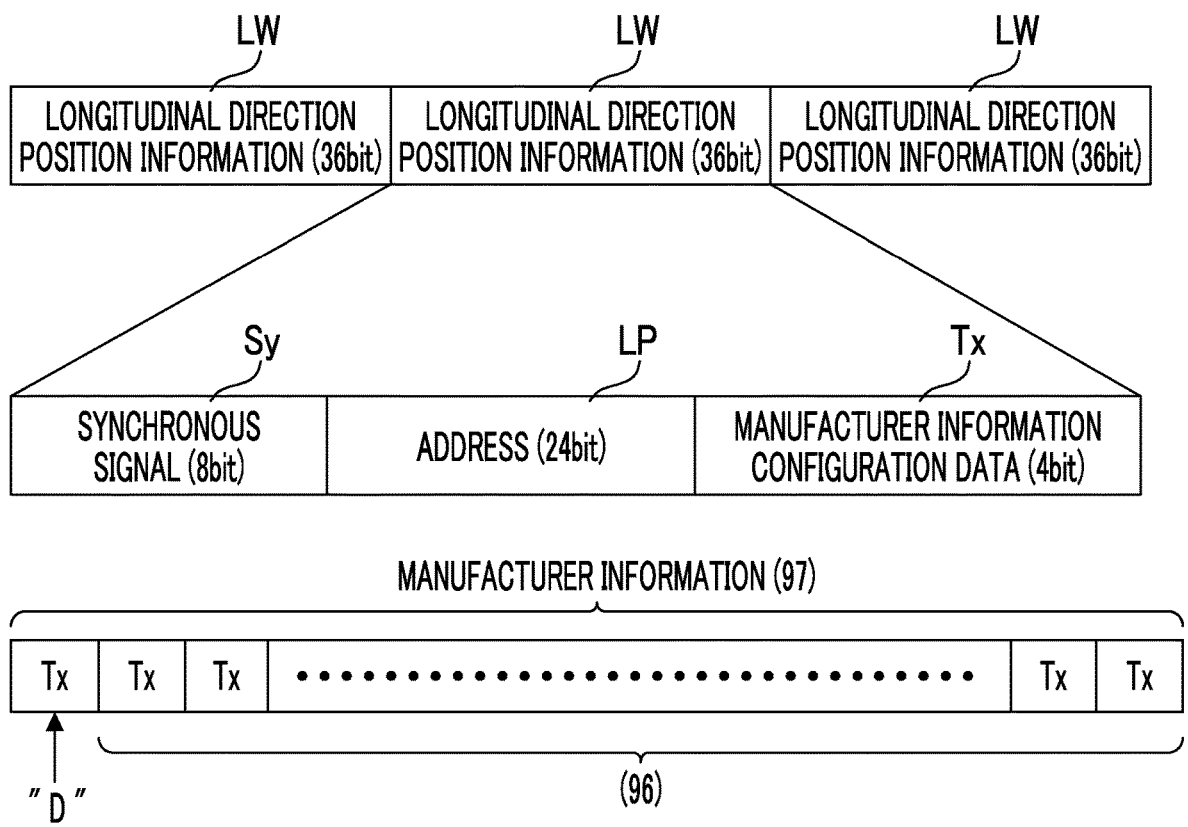

FIG. 13
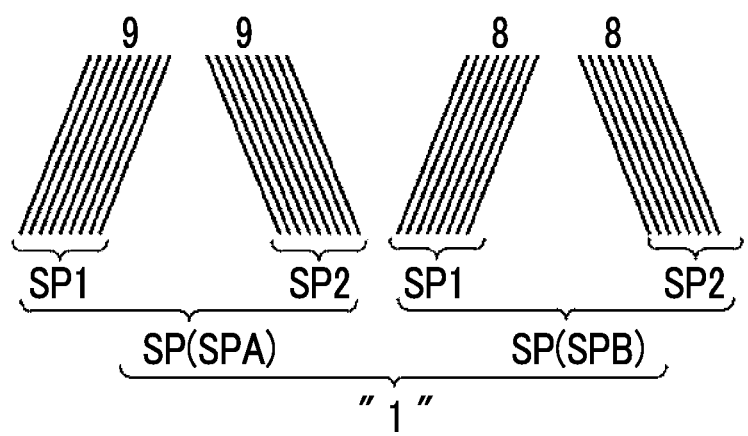
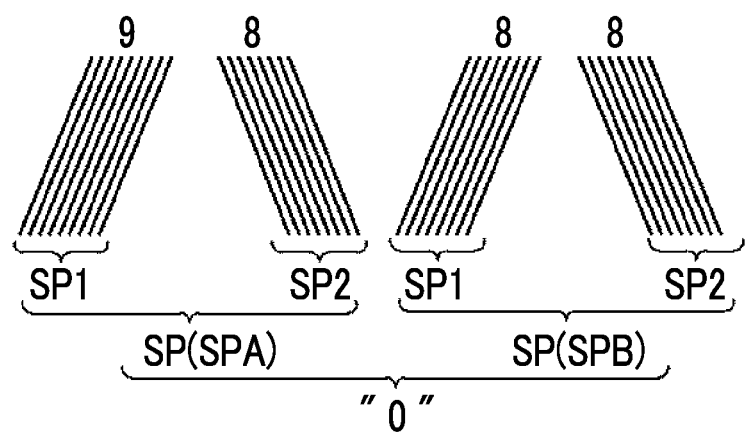

MAGNETIC TAPE, MANUFACTURING METHOD OF MAGNETIC TAPE, MANUFACTURING DEVICE OF MAGNETIC TAPE, AND RECORDING AND REPRODUCING SYSTEM

CROSS-REFERENCE TO RELATED APPLICATION

This application claims priority from Japanese Patent Application No. 2018-045694, filed on Mar. 13, 2018, the disclosure of which is incorporated by reference herein in its entirety.

BACKGROUND

Field of the Invention

The present invention relates to a magnetic tape, a manufacturing method of a magnetic tape, a manufacturing device of a magnetic tape, and a recording and reproducing system.

Related Art

In related art, a servo signal is written on a magnetic tape, in order to cause a recording and reproducing element of a magnetic head to follow a data track of the magnetic tape on which magnetic information is recorded. As this writing system of the servo signal on the magnetic tape, a timing-based system is known.

As a technology regarding this timing-based system, JP2014-199706A discloses a magnetic recording medium including a magnetic layer, a part of which is magnetized in a first direction including a component of a vertical direction, which is vertical to an upper surface of the magnetic layer, and on which a servo signal is recorded. In this magnetic recording medium, the magnetic layer is magnetized in a second direction which is a direction opposite to the first direction, before the servo signal is recorded on the magnetic layer.

In addition, JP2005-327386A discloses a magnetic recording medium on which servo patterns are repeatedly formed in a direction, in which a servo band extends. This servo pattern includes a first magnetization region which is formed so to cross the servo band and tilt with respect to a width direction of the servo band at a predetermined angle, and a second magnetization region which is formed so to cross the servo band and is not parallel to the first magnetization region. In this magnetic recording medium, the servo band is magnetized with direct current, and accordingly, the magnetization direction thereof is directed one direction, and the magnetization direction of the first magnetization region and the second magnetization region is directed a direction opposite to the magnetization direction of the servo band. In addition, in the magnetic recording medium, the predetermined angle of the first magnetization region is set to be 8 degrees to 20 degrees.

JP2005-317179A discloses a magnetic tape in which information is embedded in a servo signal by making a interval of linear patterns included in a servo signal in a longitudinal direction of the servo band different from each other.

In recent years, realization of high-density recording of a magnetic tape has proceeded, and several hundreds of data tracks are formed in data band of the magnetic tape in a width direction of the magnetic tape. As a result, a width and a interval of the data tracks become extremely narrow. In the future, it is expected that realization of the high-density recording of the magnetic tape further proceeds, and therefore, a higher accuracy is required for positioning of a magnetic head of the magnetic tape in the width direction.

Particularly, in a magnetic tape in which capacity for one reel is several tens to several hundreds of TBs, a positioning accuracy of a magnetic head having an extremely high standard deviation equal to or smaller than 10 nm is required, and accordingly, a detection error of a servo signal due to slight noise in a case of recording and reproducing the magnetic tape greatly affects the accuracy of the positioning of the magnetic head.

Therefore, it is thought that, in order to increase resolution of the servo signal of the servo band in the width direction, an angle for tilting the first magnetization region becomes great. However, in a case where this angle is greater than 25 degrees, an output and S/N ratio of the servo signal may decrease due to azimuth loss and the positioning of the magnetic head may not be performed with an excellent accuracy.

In addition, it is thought that, by increasing the number of linear patterns included in the servo pattern, the number of data items used for calculating an average value in a case of positioning the magnetic head can be increased, and as a result, the effect of noise is prevented to improve the accuracy of the positioning of the magnetic head. However, in this case, the width of the linear pattern becomes narrow, and accordingly, the positioning of the magnetic head may not be performed with an excellent accuracy.

In the technologies disclosed in JP2014-199706A, JP2005-327386A, and JP2005-317179A, these problems are not considered.

This disclosure is made in consideration of these circumstances and a first object thereof is to provide a magnetic tape capable of performing positioning of a magnetic head with an excellent accuracy, a manufacturing method of a magnetic tape, a manufacturing device of a magnetic tape, and a recording and reproducing system.

Meanwhile, in a case where the number of linear patterns included in the servo pattern is increased to improve an accuracy of the positioning of the magnetic head, a interval of the adjacent linear patterns in a longitudinal direction of the servo band becomes narrow. In this case, in a case where information is embedded in a servo signal by making the interval of the linear patterns in the longitudinal direction of the servo band different from each other, the information embedded in the servo signal may not be read out with an excellent accuracy.

In the technologies disclosed in JP2014-199706A, JP2005-327386A, and JP2005-317179A, these problems are not considered.

SUMMARY

This disclosure is made in consideration of these circumstances and a second object thereof is to provide a magnetic tape capable of performing readout of information embedded in a servo signal with an excellent accuracy, a manufacturing method of a magnetic tape, a manufacturing device of a magnetic tape, and a recording and reproducing system.

In order to achieve the first object, there is provided a magnetic tape of the disclosure, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, the magnetic tape is used in a recording and reproducing system which uses a reproducing element for reproducing the servo pattern, a width of which satisfies W1≤(1/tan θ)×stripe width T of the servo pattern, and the angle θ is greater than 25° and equal to or smaller than 45°.

In the magnetic tape of the disclosure, at least one of a condition that the stripe interval of the servo pattern is 0.6 µm to 2.4 µm or a condition that the number of stripes in the first magnetization region and the second magnetization region is 6 to 14 may be satisfied.

In order to achieve the first object, there is provided a magnetic tape of the disclosure, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, the magnetic tape is used in a recording and reproducing system which uses a reproducing element for reproducing the servo pattern, a width of which satisfies W1≤(1/tan θ)×stripe width T of the servo pattern, and at least one of a condition that the stripe interval of the servo pattern is 0.6 µm to 2.4 µm or a condition that the number of stripes in the first magnetization region and the second magnetization region is 6 to 14 is satisfied.

In the magnetic tape of the disclosure, the angle θ may be greater than 25° and equal to or smaller than 45°.

The magnetic tape of the disclosure may be used in a recording and reproducing system which uses a reproducing element for reproducing the servo pattern, a width of which satisfies W2≤(0.5/tan θ)×stripe width T of the servo pattern.

In the magnetic tape of the disclosure, a magnetic powder of the magnetic tape may be strontium ferrite or barium ferrite.

In the magnetic tape of the disclosure, a volume of a particle of the magnetic powder may be 900 nm³ to 1,500 nm³.

In the magnetic tape of the disclosure, a magnetization direction may be directed one direction by magnetizing the servo band with direct current in the predetermined one direction in a longitudinal direction, and the magnetization direction of the first magnetization region and the second magnetization region may be directed a direction different from or a direction partially different from the magnetization direction of the servo band.

In order to achieve the second object, there is provided a magnetic tape of the disclosure, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, and information is embedded by making at least one of the number of stripes between the first magnetization region and the second magnetization region in the servo pattern, or the number of stripes of at least one of the first magnetization region or the second magnetization region between the servo patterns, different from each other.

Meanwhile, in order to achieve the first object, there is provided a manufacturing method of a magnetic tape of the disclosure, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, the method comprising: recording the servo pattern on the servo band of the magnetic tape used in a recording and reproducing system which uses a reproducing element for reproducing the servo pattern, a width of which satisfies W1≤(1/tan θ)×stripe width T of the servo pattern, by setting the angle θ to be greater than 25° and equal to or smaller than 45°.

In order to achieve the first object, there is provided a manufacturing device of a magnetic tape of the disclosure, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, the device comprising: a recording unit that records the servo pattern on the servo band of the magnetic tape used in a recording and reproducing system which uses a reproducing element for reproducing the servo pattern, a width of which satisfies W1≤(1/tan θ)×stripe width T of the servo pattern, by setting the angle θ to be greater than 25° and equal to or smaller than 45°.

In order to achieve the first object, there is provided a manufacturing method of a magnetic tape of the disclosure, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, the method comprising: recording the servo pattern on the servo band of the magnetic tape used in a recording and reproducing system which uses a reproducing element for reproducing the servo pattern, a width of which satisfies W1≤(1tan θ)×stripe width T of the servo pattern, by satisfying at least one of a condition that the stripe interval of the servo pattern is 0.6 µm to 2.4 µm or a condition that the number of stripes in the first magnetization region and the second magnetization region is 6 to 14.

In order to achieve the first object, there is provided a manufacturing device of a magnetic tape of the disclosure, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, the device comprising: a recording unit that records the servo pattern on the servo band of the magnetic tape used in a recording and reproducing system which uses a reproducing element for reproducing the servo pattern, a width of which satisfies W1≤(1/tan θ)×stripe width T of the servo pattern, by satisfying at least one of a condition that the stripe interval of the servo pattern is 0.6 µm to 2.4 µm or a condition that the number of stripes in the first magnetization region and the second magnetization region is 6 to 14.

In order to achieve the second object, there is provided a manufacturing method of a magnetic tape of the disclosure, the method comprising: embedding information on a servo band of the magnetic tape, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, by recording the servo pattern by making at least one of the number of stripes between the first magnetization region and the second magnetization region in the servo pattern, or the number of stripes of at least one of the first magnetization region or the second magnetization region between the servo patterns, different from each other.

In order to achieve the second object, there is provided a manufacturing device of a magnetic tape of the disclosure, the device comprising: a recording unit that embeds information on a servo band of the magnetic tape, in which servo patterns, each including a first magnetization region formed to be tilted with respect to a width direction of a servo band by an angle θ along the width direction of the servo band and a second magnetization region not parallel to the first magnetization region along the width direction of the servo band, are repeatedly formed in a longitudinal direction of the servo band, by recording the servo pattern by making at least one of the number of stripes between the first magnetization region and the second magnetization region in the servo pattern, or the number of stripes of at least one of the first magnetization region or the second magnetization region between the servo patterns, different from each other.

In order to achieve the first object, there is provided a recording and reproducing system of the disclosure, comprising: a magnetic head including a servo signal readout element which reads out a servo pattern recorded on a servo band of the magnetic tape of the disclosure and a recording and reproducing element which performs at least one of recording or reproducing of data with respect to a data band of the magnetic tape; and a control unit which performs positioning of the magnetic head along a width direction of the magnetic tape, in accordance with an interval of a detection of the servo pattern performed by the servo signal readout element, in a case of performing at least one of recording or reproducing of data with respect to the data band.

According to the disclosure, it is possible to perform the positioning of the magnetic head with an excellent accuracy. In addition, according to the disclosure, it is possible to read out information embedded in the servo signal with an excellent accuracy.

BRIEF DESCRIPTION OF THE DRAWINGS

FIG. 6 is a diagram for describing a standard deviation of positioning errors of the magnetic head occurring due to noise at the time of recording and reproducing.

FIG. 10 is a diagram showing an example of a data structure of information to be embedded in the servo band.

FIG. 13 is a diagram for describing an example of the embedding method of information on the servo band.

DETAILED DESCRIPTION

Hereinafter, embodiments for implementing technologies of the disclosure will be described in detail with reference to the drawings.

Figure 1A:
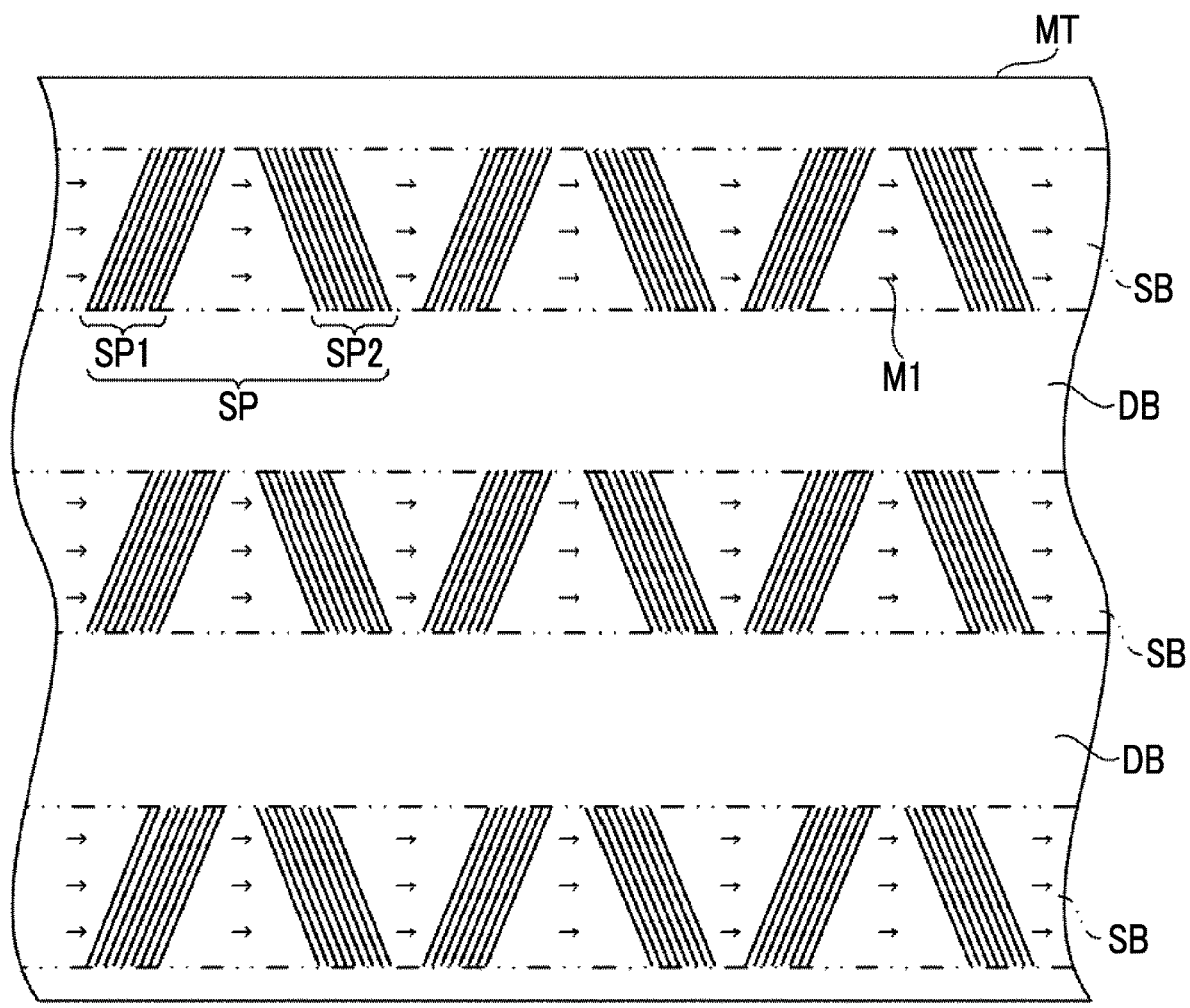
FIG. 1A is a plan view showing an example of a magnetization region formed in a servo band of a magnetic tape.

First, a configuration of a magnetic tape MT according to the embodiment will be described with reference to FIGS. 1A and 1B. As shown in FIG. 1A, in the magnetic tape MT, three servo bands SB are formed along a longitudinal direction of the magnetic tape MT. In addition, the three servo bands SB are formed so as to be arranged in a width direction of the magnetic tape MT at an equivalent interval. Data bands DB are respectively formed between the three servo bands SB. In the data band DB, a plurality of data tracks DT (see FIG. 2A) for recording magnetic information are formed along a longitudinal direction of the data band DB so as to be arranged in the width direction of the data band DB. The number of servo bands SB and the data bands DB is not limited to the example shown in FIGS. 1A to 1C. For example, the number of servo bands SB may be 5 and the number of data bands DB may be 4.

The servo bands SB is a portion in which the servo patterns SP are formed, and the magnetization direction M1 thereof is directed in one direction of the magnetic tape MT (for example, direction opposite to the running direction of the magnetic tape MT), so that the servo band SB is magnetized with current direction.

In the servo band SB, the servo patterns SP for performing tracking controlling of a magnetic head H (see FIG. 2A) are repeatedly formed in a direction in which the servo band SB extends. The servo pattern SP is configured to include a first magnetization region SP1 and a second magnetization region SP2.

Figure 1B:
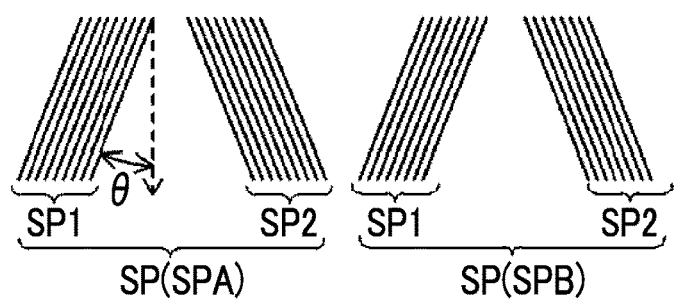
FIG. 1B is a plan view for describing an angle of a first magnetization region in a width direction of the magnetic tape.

As shown in FIG. 1B, the first magnetization region SP1 is formed to be tilted with respect to the width direction of the servo band SB by an angle θ along the width direction of the servo band SB. This angle θ is also referred to as an azimuth angle. In the embodiment, the angle θ is set to be greater than 25 degrees and equal to or smaller than 45 degrees. The details thereof will be described later, and in the embodiment, 1 bit is allocated to a pair of adjacent servo patterns SP. Accordingly, hereinafter, in a case of distinguishing the respective servo patterns SP, the first pair of servo patterns SP is referred to as a "servo pattern SPA" and the second pair is referred to as a "servo pattern SPB".

Figure 1C:
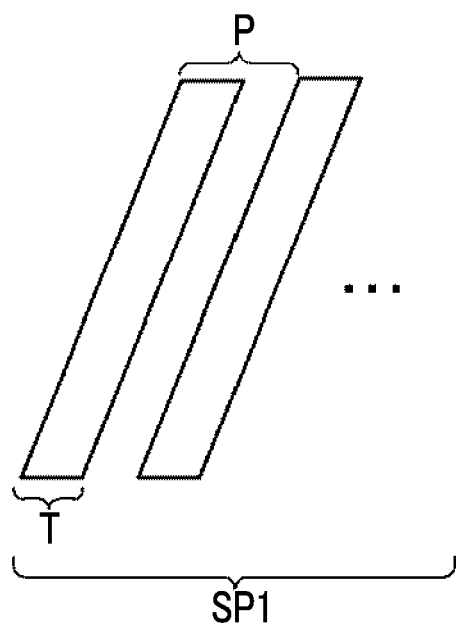
FIG. 1C is a plan view for describing a stripe interval and a stripe width.

Hereinafter, the number of linear patterns included in the first magnetization region SP1 and the number of linear patterns included in the second magnetization region SP2 are referred to as the "number of stripes". In addition, hereinafter, as shown in FIG. 1C, a interval of a portion corresponding to the adjacent linear patterns is referred to as a "stripe interval P" the width of the linear pattern is referred to as a "stripe width T".

As shown in FIGS. 1A and 1B, the second magnetization region SP2 is formed so as not to be parallel to the first magnetization region SP1 along the width direction of the servo band SB. In the embodiment, the second magnetization region SP2 is formed so as to be linearly symmetrical to the first magnetization region SP1, with respect to a linear line along the width direction of the servo band SB. That is, the angle of the second magnetization region SP2 tilted with respect to the width direction of the servo band SB along the width direction of the servo band SB is set to be greater than 25 degrees and equal to or smaller than 45 degrees. The angle of the second magnetization region SP2 tilted with respect to the width direction of the servo band SB is not limited to be greater than 25 degrees and equal to or smaller than 45 degrees, as long as the second magnetization region SP2 is not parallel to the first magnetization region SP1 along the width direction of the servo band SB.

In the embodiment, the stripe interval P of the respective first magnetization region SP1 and second magnetization region SP2 is set to be 0.6 µm to 2.4 µm. In addition, in the embodiment, the number of stripes of the respective first magnetization region SP1 and second magnetization region SP2 is set to be 6 to 14.

Next, a process of positioning the magnetic head H with respect to the width direction of the magnetic tape MT on which the servo pattern SP is formed will be described with reference to FIGS. 2A and 2B.

Figure 2A:
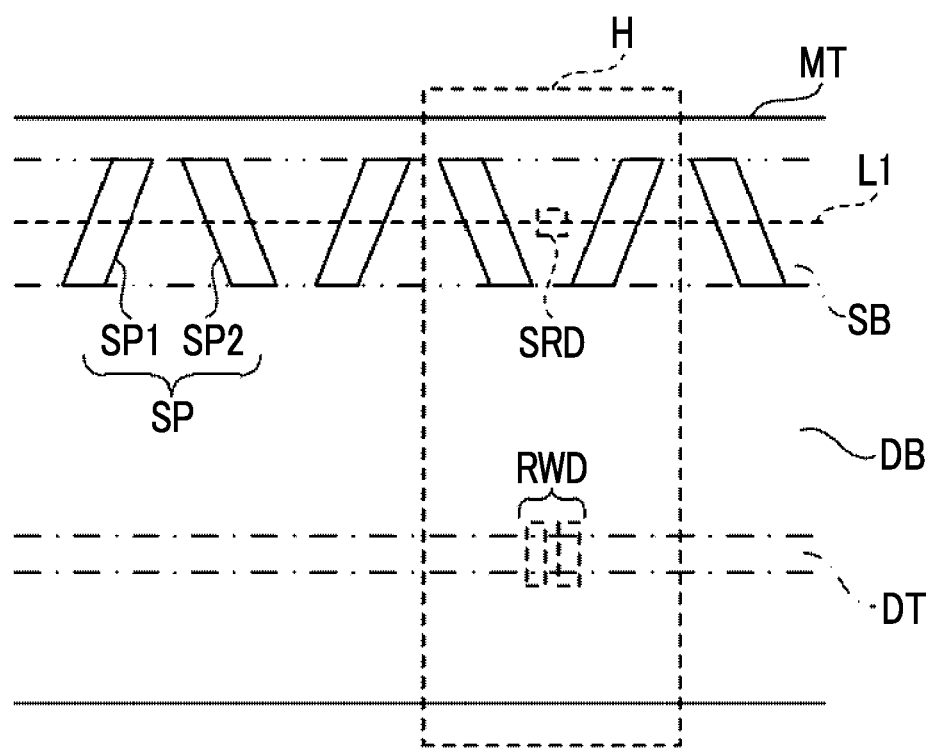
FIG. 2A is a plan view for describing a positioning process of a magnetic head.
Figure 2B:
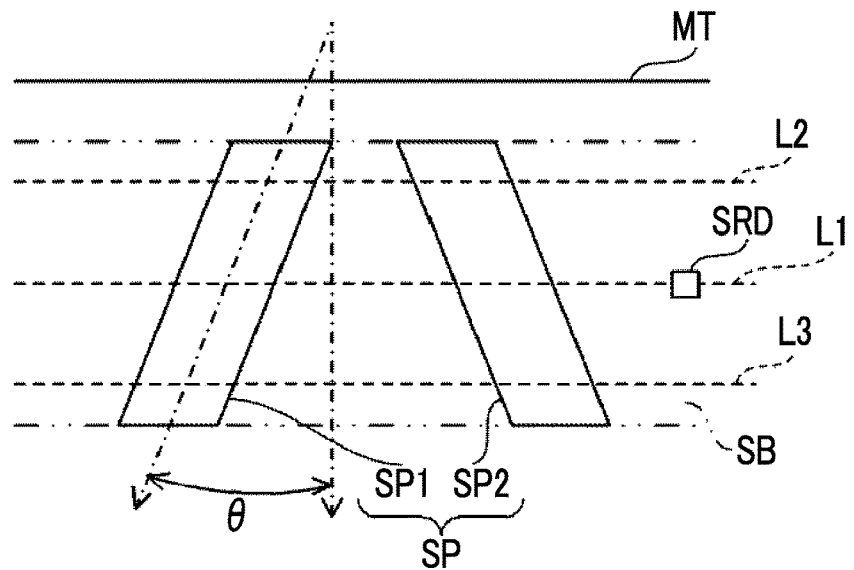
FIG. 2B is a plan view for describing the positioning process of the magnetic head.

As shown in FIG. 2A, the magnetic head H according to the embodiment includes a servo signal readout element SRD which reads out and reproduces the servo pattern SP recorded on the servo band SB, and a recording and reproducing element RWD which performs recording and reproducing of information with respect to the data track DT. Hereinafter, the position of the magnetic head H, the position of the servo signal readout element SRD, and the position of the recording and reproducing element RWD, which are simply noted, respectively mean positions along the width direction of the magnetic tape MT.

In the magnetic tape MT according to the embodiment, in a case where the magnetic tape MT runs in a predetermined running direction (for example, right to left direction in FIGS. 2A and 2B), the servo signal readout element SRD of the magnetic head H is positioned at a predetermined position of the servo band SB in a width direction, thereby positioning the magnetic head H with respect to the magnetic tape MT. In the embodiment, for example, in a case where the servo signal readout element SRD of the magnetic head H traces a center line L1 of the servo band SB, the recording and reproducing element RWD of the magnetic head H follows a predetermined data track DT formed in the data band DB. Hereinafter, a running direction of the magnetic tape MT is simply referred to as a "running direction".

In a case where the first magnetization region SP1 and the second magnetization region SP2 pass through a position of the detection performed by the servo signal readout element SRD, the servo signal readout element SRD detects the first magnetization region SP1 and the second magnetization region SP2. In this case, the servo signal readout element SRD detects the first magnetization region SP1 and the second magnetization region SP2 at a certain timing, as long as the center line L1 of the servo band SB is traced.

Meanwhile, in a case where the position of the servo signal readout element SRD is displaced so as to trace a line of a linear line L2 on the servo band SB, a time interval for detecting the respective first magnetization region SP1 and the second magnetization region SP2 by the servo signal readout element SRD becomes narrow. This is because the first magnetization region SP1 is tilted with respect to the width direction of the servo band SB. In addition, in a case where the position of the servo signal readout element SRD is displaced so as to trace a line of a linear line L3 on the servo band SB, a time interval for detecting the respective first magnetization region SP1 and the second magnetization region SP2 by the servo signal readout element SRD becomes wide.

In the magnetic tape MT on which the servo pattern SP is recorded, the magnetic head H is positioned at a position so that the timing for detecting the first magnetization region SP1 and the second magnetization region SP2 by the servo signal readout element SRD is set as a predetermined value. Accordingly, the recording and reproducing element RWD of the magnetic head H follows a predetermined data track DT.

The angle $\theta$ becomes closer to 90 degrees, the amount of change of the time interval of the first magnetization region SP1 and the second magnetization region SP2 detected by the servo signal readout element SRD increases. That is, as the angle $\theta$ becomes closer to 90 degrees, the resolution of the servo signal in the width direction of the servo band SB increases.

In the embodiment, the angle $\theta$ is set to be greater than 25 degrees. That is, the resolution of the servo signal in the width direction of the servo band SB increases, compared to a case where the angle $\theta$ is equal to or smaller than 25 degrees.

Next, a width W of the servo signal readout element SRD of the magnetic head H will be described with reference to FIGS. 3A and 3B. Here, the width W means a length of the servo signal readout element SRD in the width direction of the servo band SB.

Figure 3A:
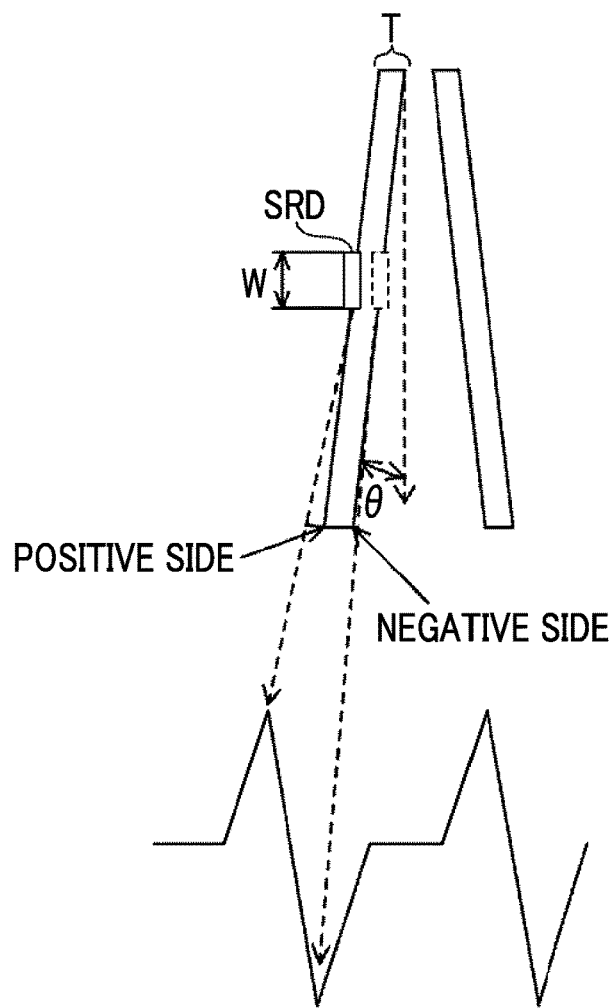
FIG. 3A is a diagram for describing a width of a servo signal readout element.

As shown in FIG. 3A, in a case where the angle $\theta$ is comparatively small and a case where the stripe width T is comparatively wide, one end portion and the other end portion of the linear pattern of the servo pattern SP in the running direction are individually read out by the servo signal readout element SRD. Hereinafter, an end portion of the linear pattern of the servo pattern SP on a side read out by the servo signal readout element SRD first is referred to as an end portion on a positive side, and an end portion thereof on a side read later is referred to as an end portion on a negative side.

In addition, a reproduced waveform detected by the servo signal readout element SRD becomes a peak (peak protruded to the upper side in the example of FIG. 3A), in a case of reading out the end portion of the linear pattern of the servo pattern SP on the positive side, and becomes a peak (peak protruded to the lower side in the example of FIG. 3A), in a case of reading out the end portion thereof on the negative side. In the embodiment, the positioning of the magnetic head H is performed using intervals of the detection between the peaks of the linear patterns corresponding to the first magnetization region SP1 and the second magnetization region SP2. Specifically, for example, the positioning of the magnetic head H is performed using an average value of the intervals of the detection between the peak of the linear patterns on the negative side corresponding to the first magnetization region SP1 and the second magnetization region SP2.

Figure 3B:
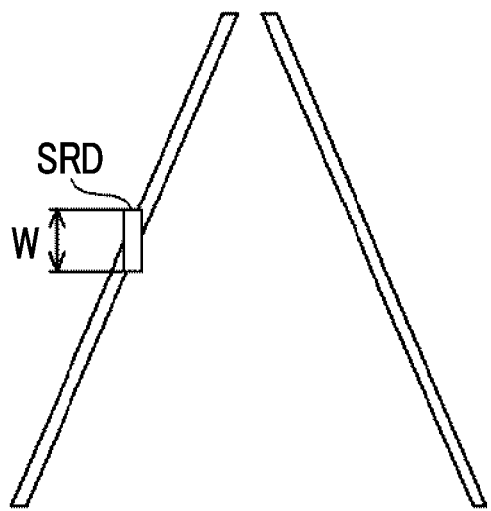
FIG. 3B is a diagram for describing the width of the servo signal readout element.

With respect to this, as in the embodiment, in a case the stripe width T is set comparatively small in order to set the angle θ to be greater than 25 degrees and equal to or smaller than 45 degrees and the number of stripes to be 6 to 14, as shown in FIG. 3B, the servo signal readout element SRD reproduces the end portion of the linear pattern of the servo pattern SP on the positive side and the end portion thereof on the negative side at the same time. By performing the reproducing at the same time, a waveform interference is generated, an output and an S/N ratio of the servo signal decrease due to the effect of the waveform interference, and as a result, the positioning of the magnetic head H may not be performed with an excellent accuracy.

Therefore, in the embodiment, the width W of the servo signal readout element SRD is set as a width satisfying W1 shown in Expression (1). θ in Expression (1) is the angle θ and T is the stripe width T.

$$W1 \leq (1/\tan \theta) \times T \quad (1)$$

The width W of the servo signal readout element SRD is more preferably a width satisfying W2 shown in Expression (2).

$$W2 \leq (0.5/\tan \theta) \times T \quad (2)$$

That is, the angle θ and the stripe width T are set as an angle and a width satisfying Expression (1) or Expression (2) with respect to the width W, and the angle θ is set to be greater than 25 degrees and equal to or smaller than 45 degrees.

Here, positioning errors of the magnetic head H with respect to a decrease in S/N ratio of the servo signal will be described with reference to FIG. 4. A vertical axis of FIG. 4 indicates a standard deviation of the positioning errors of the magnetic head H occurring due to a quantization error of analog-to-digital (AD) conversion of an inspection machine, which performs inspection of the magnetic tape MT, and a horizontal axis indicates the angle θ. In addition, the S/N ratio is 16 dB, in a case where a signal level of the servo signal becomes approximately 64%, by setting a signal level, in a case where the S/N ratio of the servo signal is 20 dB as a reference.

Figure 4:
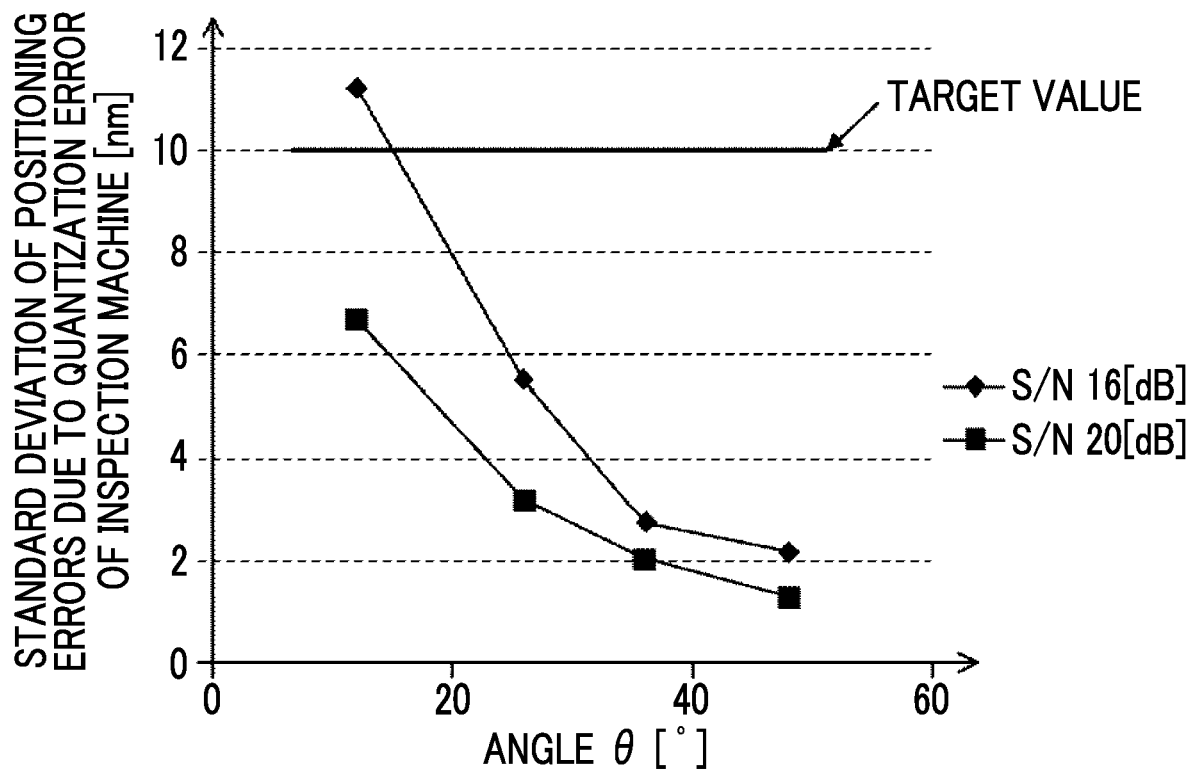
FIG. 4 is a graph showing a relationship between an angle θ and a standard deviation of positioning errors of the magnetic head occurring due to a quantization error of AD conversion of an inspection machine.

As shown in FIG. 4, in a case where the angle θ is 12 degrees, the standard deviation of the positioning errors of the magnetic head H occurring due to the quantization error is greater than 10 nm which is a target value.

With respect to this, by setting the angle θ to be greater than 25 degrees and equal to or smaller than 45 degrees, the standard deviation of the positioning errors of the magnetic head H is equal to or smaller than 10 nm which is a target value. However, in the recording and reproducing element having a width of the related art, the effect of the azimuth loss, in a case where the angle θ is increased, increases, and this affects the positioning errors of the magnetic head H. With respect to this, by setting the width W of the servo signal readout element SRD as a width satisfying W1 shown in Expression (1), the output of the servo signal which is equal to or greater than 60% can be obtained, compared to a servo signal, in a case where the angle θ is 12 degrees. It is more preferable to set the width W of the servo signal readout element SRD as a width satisfying W2 shown in Expression (2), because the output of the servo signal which is equal to or greater than 90% can be obtained, compared to a servo signal, in a case where the angle θ is 12 degrees.

Next, an effect of preventing the azimuth loss, in a case of using the magnetic tape MT in the recording and reproducing system including the servo signal readout element SRD having the width W satisfying Expression (1) and Expression (2) will be described with reference to FIG. 5.

Figure 5:
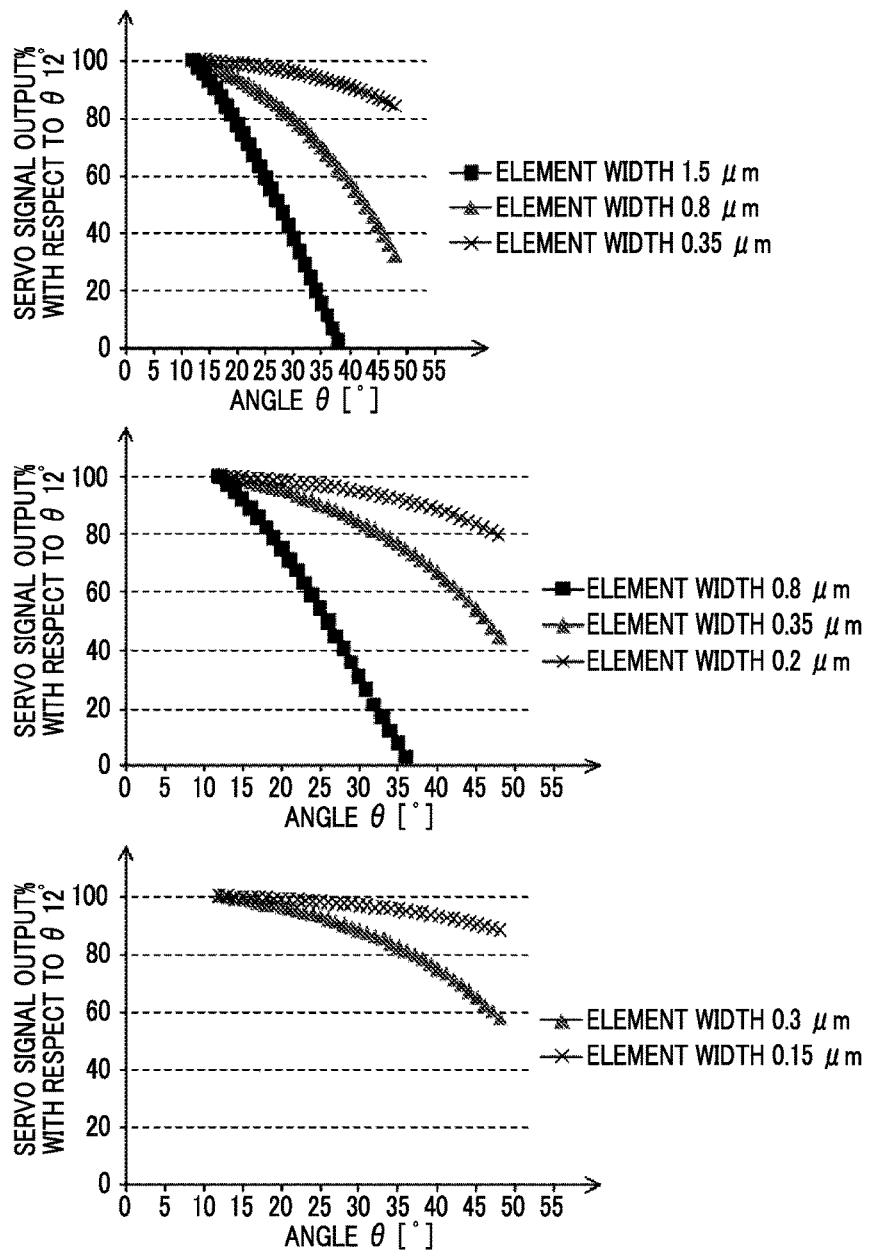
FIG. 5 is a diagram for describing prevention of azimuth loss.

As shown in FIG. 5, in a case where the angle θ is set as 36 degrees, the stripe interval P is set as 1.2 μm, and the stripe width T is set as 0.6 μm, it is possible to ensure the output of 68% with respect to the output of the servo signal, in a case where the angle θ is 12 degrees, by using the servo signal readout element SRD having the width W of 0.8 μm (W1≤(1/tan 36°)×0.6=0.83). In this case, it is possible to ensure the output of 93% with respect to the output of the servo signal, in a case where the angle θ is 12 degrees, by using the servo signal readout element SRD having the width W of 0.35 μm (W2≤(0.5/tan 36°)×0.6=0.41).

In a case where the angle θ is set as 36 degrees, the stripe interval P is set as 0.6 μm, and the stripe width T is set as 0.3 μm, it is possible to ensure the output of 75% with respect to the output of the servo signal, in a case where the angle θ is 12 degrees, by using the servo signal readout element SRD having the width W of 0.35 μm (W1≤(1/tan 36°)×0.3=0.41). In this case, it is possible to ensure the output of 91% with respect to the output of the servo signal, in a case where the angle θ is 12 degrees, by using the servo signal readout element SRD having the width W of 0.2 μm (W2≤(0.5/tan 36°)×0.3=0.21).

In a case where the angle θ is set as 45 degrees, the stripe interval P is set as 0.6 μm, and the stripe width T is set as 0.3 μm, it is possible to ensure the output of 65% with respect to the output of the servo signal, in a case where the angle θ is 12 degrees, by using the servo signal readout element SRD having the width W of 0.3 μm (W1≤(1/tan 45°)×0.3=0.3). In this case, it is possible to ensure the output of 90% with respect to the output of the servo signal, in a case where the angle θ is 12 degrees, by using the servo signal readout element SRD having the width W of 0.15 μm (W2≤(0.5/tan 45°)×0.3=0.15).

Next, a standard deviation of the positioning errors of the magnetic head H occurring due to noise, at the time of recording and reproducing using the servo signal readout element SRD having the width W satisfying Expression (2) will be described, with reference to FIG. 6.

The standard deviation of the positioning errors of the magnetic head H, in a case where the angle θ is 12 degrees, the magnetic powder of the magnetic tape MT is set as barium ferrite (BaFe), the volume of the particles of the magnetic powder is 1,800 $nm^3$, and the width W is 0.35 μm, under the respective conditions (1-1) to (1-3) below is shown.

(1-1) The standard deviation of the positioning errors of the magnetic head H occurring due to noise, at the time of recording and reproducing, in a case where the number of stripes is 4, the stripe width T is 1.2 μm, and the stripe interval P is 2.4 μm, is 13.0 nm.

(1-2) The standard deviation of the positioning errors of the magnetic head H occurring due to noise, at the time of recording and reproducing, in a case where the number of stripes is 8, the stripe width T is 0.6 μm, and the stripe interval P is 1.2 μm, is 9.4 nm.

(1-3) The standard deviation of the positioning errors of the magnetic head H occurring due to noise, at the time of recording and reproducing, in a case where the number of stripes is 12, the stripe width T is 0.4 μm, and the stripe interval P is 0.8 μm, is 7.8 nm.

The standard deviation of the positioning errors of the magnetic head H, in a case where the angle θ is 26 degrees, the magnetic powder of the magnetic tape MT is set as BaFe, the volume of the particles of the magnetic powder is 1,800 nm$^3$, and the width W is 0.35 μm, under the respective conditions (2-1) to (2-3) below is shown.

(2-1) The standard deviation of the positioning errors of the magnetic head H occurring due to noise, at the time of recording and reproducing, in a case where the number of stripes is 4, the stripe width T is 1.2 μm, and the stripe interval P is 2.4 μm, is 4.7 nm.

(2-2) The standard deviation of the positioning errors of the magnetic head H occurring due to noise, at the time of recording and reproducing, in a case where the number of stripes is 8, the stripe width T is 0.6 μm, and the stripe interval P is 1.2 μm, is 3.9 nm.

(2-3) The standard deviation of the positioning errors of the magnetic head H occurring due to noise, at the time of recording and reproducing, in a case where the number of stripes is 12, the stripe width T is 0.4 μm, and the stripe interval P is 0.8 μm, is 3.5 nm.

The standard deviation of the positioning errors of the magnetic head H, in a case where the angle θ is 36 degrees, the magnetic powder of the magnetic tape MT is set as BaFe, the volume of the particles of the magnetic powder is 1,800 nm$^3$, and the width W is 0.35 μm, under the respective conditions (3-1) to (3-3) below is shown.

(3-1) The standard deviation of the positioning errors of the magnetic head H occurring due to noise, at the time of recording and reproducing, in a case where the number of stripes is 4, the stripe width T is 1.2 μm, and the stripe interval P is 2.4 μm, is 3.5 nm.

(3-2) The standard deviation of the positioning errors of the magnetic head H occurring due to noise, at the time of recording and reproducing, in a case where the number of stripes is 8, the stripe width T is 0.6 μm, and the stripe interval P is 1.2 μm, is 2.6 nm.

(3-3) The standard deviation of the positioning errors of the magnetic head H occurring due to noise, at the time of recording and reproducing, in a case where the number of stripes is 12, the stripe width T is 0.4 μm, and the stripe interval P is 0.8 μm, is 2.2 nm.

The standard deviation of the positioning errors of the magnetic head H, in a case where the angle θ is 45 degrees, the magnetic powder of the magnetic tape MT is set as BaFe, the volume of the particles of the magnetic powder is 1,800 nm$^3$, and the width W is 0.1 μm, under the respective conditions (4-1) to (4-3) below is shown.

(4-1) The standard deviation of the positioning errors of the magnetic head H occurring due to noise, at the time of recording and reproducing, in a case where the number of stripes is 4, the stripe width T is 1.2 μm, and the stripe interval P is 2.4 μm, is 2.6 nm.

(4-2) The standard deviation of the positioning errors of the magnetic head H occurring due to noise, at the time of recording and reproducing, in a case where the number of stripes is 8, the stripe width T is 0.6 μm, and the stripe interval P is 1.2 μm, is 1.9 nm.

(4-3) The standard deviation of the positioning errors of the magnetic head H occurring due to noise, at the time of recording and reproducing, in a case where the number of stripes is 12, the stripe width T is 0.4 μm, and the stripe interval P is 0.8 μm, is 1.6 nm.

The standard deviation of the positioning errors of the magnetic head H, in a case where the angle θ is 45 degrees, the magnetic powder of the magnetic tape MT is set as strontium ferrite (SrFe), the volume of the particles of the magnetic powder is 995 nm$^3$, and the width W is 0.1 μm, under the respective conditions (5-1) to (5-3) below is shown.

(5-1) The standard deviation of the positioning errors of the magnetic head H occurring due to noise, at the time of recording and reproducing, in a case where the number of stripes is 4, the stripe width T is 1.2 μm, and the stripe interval P is 2.4 μm, is 2.3 nm.

(5-2) The standard deviation of the positioning errors of the magnetic head H occurring due to noise, at the time of recording and reproducing, in a case where the number of stripes is 8, the stripe width T is 0.6 μm, and the stripe interval P is 1.2 μm, is 1.7 nm.

(5-3) The standard deviation of the positioning errors of the magnetic head H occurring due to noise, at the time of recording and reproducing, in a case where the number of stripes is 12, the stripe width T is 0.4 μm, and the stripe interval P is 0.8 μm, is 1.4 nm.

Figure 7:
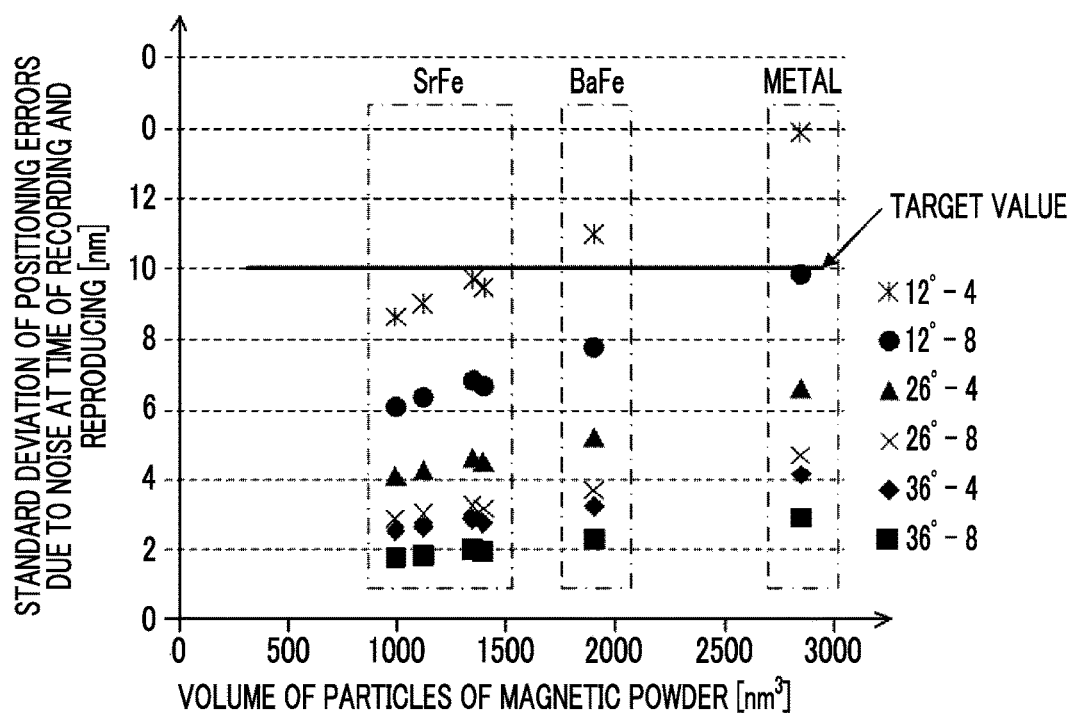
FIG. 7 is a diagram for describing a difference in standard deviation of the positioning errors of the magnetic head occurring due to noise at the time of recording and reproducing due to a difference in kind of magnetic powders and a difference in volumes of particles of the magnetic powders.

Next, FIG. 7 shows an example of a difference in standard deviation of the positioning errors of the magnetic head H occurring due to noise at the time of recording and reproducing due to a difference in kind of magnetic powders of the magnetic tape MT and a difference in volumes of particles of the magnetic powders.

FIG. 7 shows a standard deviation of the positioning errors of the magnetic head H occurring due to noise at the time of recording and reproducing, in a case where the number of stripes is 4 and a case where the number of stripes is 8, respectively regarding a combination of the angle θ, in a case where the width W is 0.35 μm, the kind of the magnetic powder, and the volume of the particle of the magnetic powder. As shown in FIG. 7, by reducing the volume of the particles of the magnetic powder, it is possible to reduce the positioning error of the magnetic head H occurring due to noise at the time of recording and reproducing.

Next, a method of embedding information on the servo band SB according to the embodiment will be described with reference to FIGS. 8 and 9.

Figure 8:
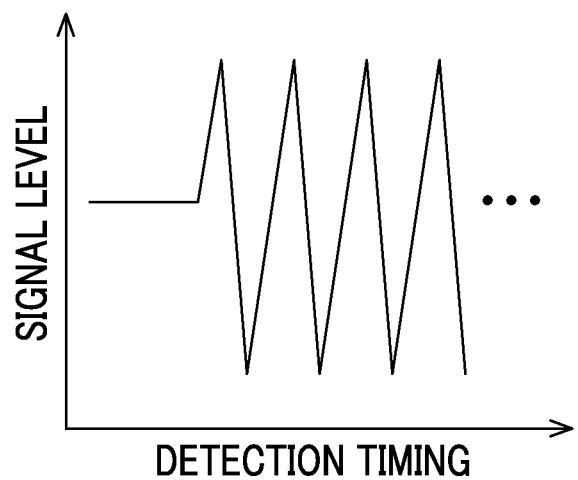
FIG. 8 is a graph for describing an interval of detection of a peak of a signal level of a signal detected by the servo signal readout element.

As shown in FIG. 8, in the embodiment, the stripe interval P is 0.6 μm to 2.4 μm, and accordingly, the interval of the detection of the peak of the signal level of the signal detected by the servo signal readout element SRD is comparatively narrow. Therefore, even in a case where the information is embedded in the servo band SB by making the stripe intervals P different from each other, the information may not be read with an excellent accuracy. Thus, in the embodiment, as shown in FIG. 9, the information is embedded in the servo band SB by making the number of stripes different from each other.

Specifically, the information is embedded in the servo band SB by making the number of stripes of the servo pattern SPA different from each other as 10 and 9, among a pair of servo patterns SP. More specifically, as shown in the upper portion of FIG. 9, "1" is allocated to a pair of servo patterns SP in which the number of stripes of the servo pattern SPA is 9 and the number of stripes of the servo pattern SPB is 8.

Figure 9:
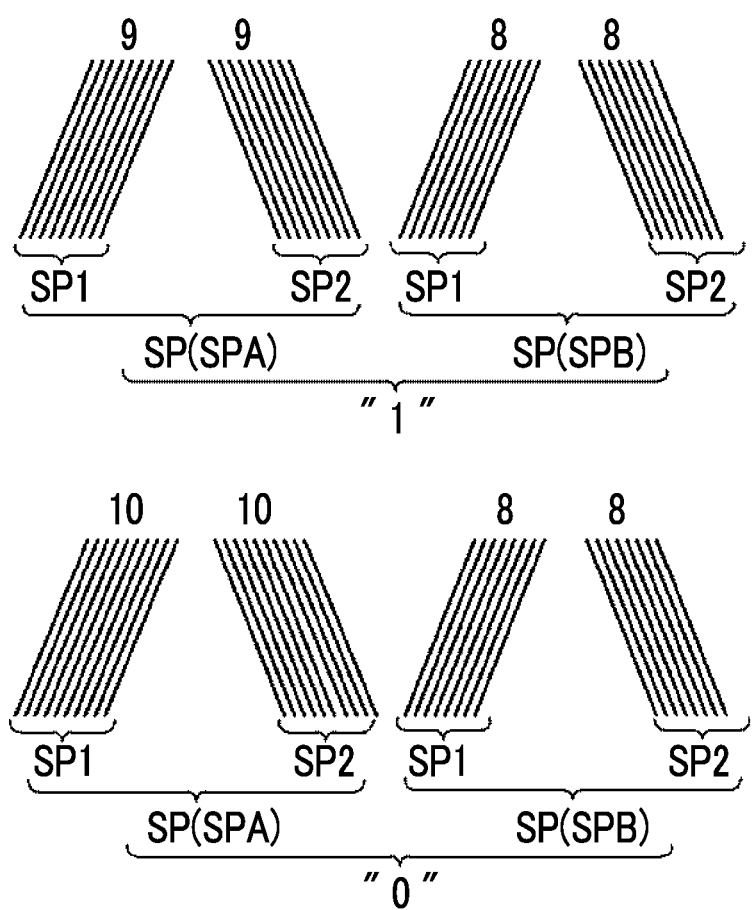
FIG. 9 is a diagram for describing an example of an embedding method of information on the servo band.

Meanwhile, as shown in the lower portion of FIG. 9, "0" is allocated to a pair of servo patterns SP in which the number of stripes of the servo pattern SPA is 10 and the number of stripes of the servo pattern SPB is 8. By replacing these pairs of the servo patterns SP according to a bit stream showing information which is an embedding target, the information is embedded in the servo band SB.

Next, a structure of data based on "ECMA-319 standard" will be described as an example of a data structure of information to be embedded in the servo band SB according to the embodiment with reference to FIG. 10.

As shown in FIG. 10, the data to be embedded in all of the servo band SB is configured to include the predetermined number of pairs (for example, 36 pairs) of servo patterns SP, that is, a plurality of longitudinal direction position information LW which is data of the predetermined number of bits (for example, 36 bits). The longitudinal direction position information LW is configured to include a synchronous signal Sy of 8 bit shown in the front, an address LP configured to include six data items of 4 bits showing the position of the magnetic tape MT in the longitudinal direction, and a manufacturer information configuration data Tx of 4 bits.

In addition, the manufacturer information configuration data Tx is data recognized as one manufacturer information MI by reading 97 longitudinal direction position information items LW. In the configuration thereof, the data showing that is in the front (for example, data as "D" shown by converting data of 4 bits which is "0001" with a predetermined table) is written in the manufacturer information configuration data Tx in the front, and data other than "D" (for example, "0, 1, . . . , 9, A, B, and C") is randomly written in the subsequent 96 manufacturer information configuration data items Tx. The data showing a manufacturer ID, information regarding a date of manufacture of the magnetic tape MT, a serial number of the magnetic tape MT, a servo writer ID, and an operator ID is embedded in these 96 manufacturer information configuration data items Tx. In addition, servo band information showing which servo band SB is shown among the plurality of servo bands SB, is also embedded in these 96 manufacturer information configuration data items Tx.

Next, a configuration of a servo writer SW as an example of a manufacturing device of the magnetic tape MT which records the servo pattern SP on each servo band SB of the magnetic tape MT according to the embodiment will be described with reference to FIG. 11.

Figure 11A:
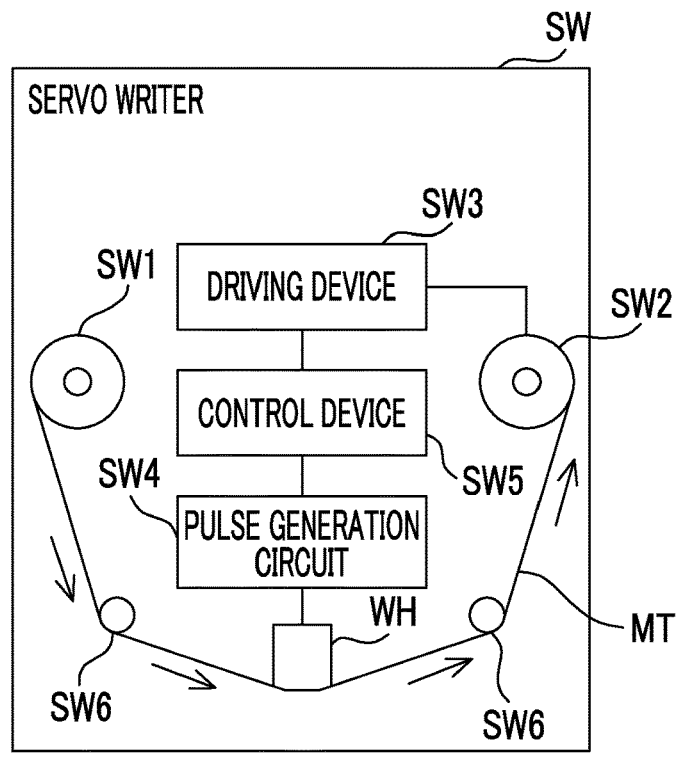
FIG. 11A is a diagram showing an example of a configuration of a servo writer.

As shown in FIG. 11A, the servo writer SW includes a sending reel SW1, a winding reel SW2, a driving device SW3, a pulse generation circuit SW4, a control device SW5, and a servo signal writing head WH. In addition, the servo writer SW also includes a power device, a cleaning device which cleans the magnetic tape MT, a verifying device which performs inspection of the servo pattern SP recorded on the magnetic tape MT, and the like which are not shown. Further, the servo writer SW also includes a permanent magnet PM (see FIG. 12). The servo signal writing head WH is an example of a recording unit which records the servo pattern SP on the servo band SB of the magnetic tape MT.

In the sending reel SW1, the magnetic tape MT cut to have a product width from a raw web having a wide width, before writing the servo pattern SP is set on a pancake reel having a great diameter, and the magnetic tape MT is sent at the time of writing the servo pattern SP. The magnetic tape MT sent from the sending reel SW1 is guided to a guide SW6 and the like and transported to the servo signal writing head WH. The magnetic tape MT in which the servo pattern SP is recorded on each servo band SB with the servo signal writing head WH is guided to the guide SW6 and the like and transported to the winding reel SW2. The winding reel SW2 is rotatably driven by a driving device SW3, and the magnetic tape MT on which the servo pattern SP is recorded is wound up.

The driving device SW3 is a device for rotatably driving the winding reel SW2, and includes a motor, a motor driving circuit for supplying a current to the motor, a gear for connecting a motor axis and the winding reel SW2, and the like. In the driving device SW3, a motor current is generated by the motor driving circuit based on a motor current signal from the control device SW5, this motor current is supplied to the motor, and a rotation driving force of the motor is transmitted to the winding reel SW2 through the gear to rotatably drive the winding reel SW2.

The pulse generation circuit SW4 is a circuit which supplies a recording pulse current to a plurality of coils C (see FIG. 11B) provided in the servo signal writing head WH based on the pulse control signal from the control device SW5, and is independently provided in each of the plurality of coils C. Specifically, the pulse generation circuit SW4 alternately generates a pulse current having positive polarity or negative polarity and a zero current, based on the pulse control signal from the control device SW5, and accordingly, the servo pattern SP is written in a predetermined position of each servo band SB. The recording pulse current is a current value sufficient for magnetizing the magnetic layer of the magnetic tape MT by a leakage flux from a gap pattern G (see FIG. 11B), and is set by considering properties of the coil C of the servo signal writing head WH.

Figure 11B:
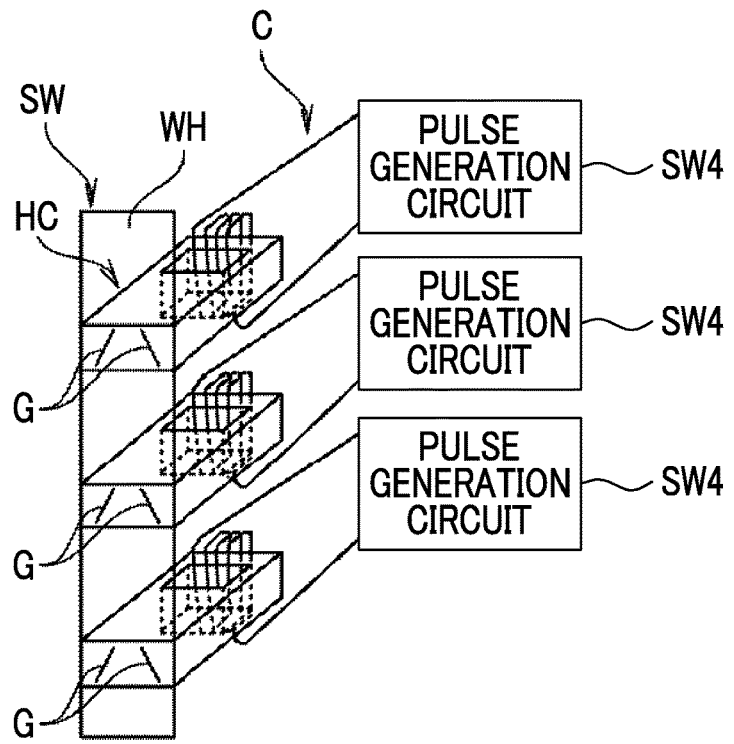
FIG. 11B is a diagram showing an example of the configuration of the servo writer.

As shown in FIG. 11B, the servo signal writing head WH includes the gap pattern G formed at a position corresponding to each servo band SB, and the servo pattern SP is recorded on the magnetic tape MT with each gap pattern G One linear pattern of the gap pattern G is tilted according to the angle θ of the first magnetization region SP 1, and the other linear pattern is not parallel to the one linear pattern according to the second magnetization region SP2. A change of the angle θ and the stripe width T can be performed by changing the shape of the gap pattern G Regarding each gap pattern G arranged in the width direction of the magnetic tape MT at equivalent interval, the position in the width direction is strictly set, the position of the magnetic tape MT in the longitudinal direction may not be strictly set and may be lightly deviated from the position of the other gap pattern G This is because that, even in a case where the servo patterns SP of the servo bands SB are formed to be deviated from each other with each gap pattern G deviated in the longitudinal direction of the magnetic tape MT, it is possible to specify the servo band SB by referring the servo pattern SP of one servo band SB. Accordingly, the offset gap pattern G may not be accurately formed in the servo signal writing head WH.

IN addition, a head core HC is independent for each gap pattern G, and each coil C is wound around the head core HC. Each pulse generation circuit SW4 connected to each coil C converts the data for distinguishing each servo band SB encoded in the control device SW5 into a pattern of the recording pulse current, and the recording pulse current is supplied to the coil C according to this pattern. Examples of an encoding method of this data include a method disclosed in JP1998-334435A. Accordingly, a unique ID corresponding to each servo band SB is embedded in the servo signal of each servo band SB.

Figure 12:
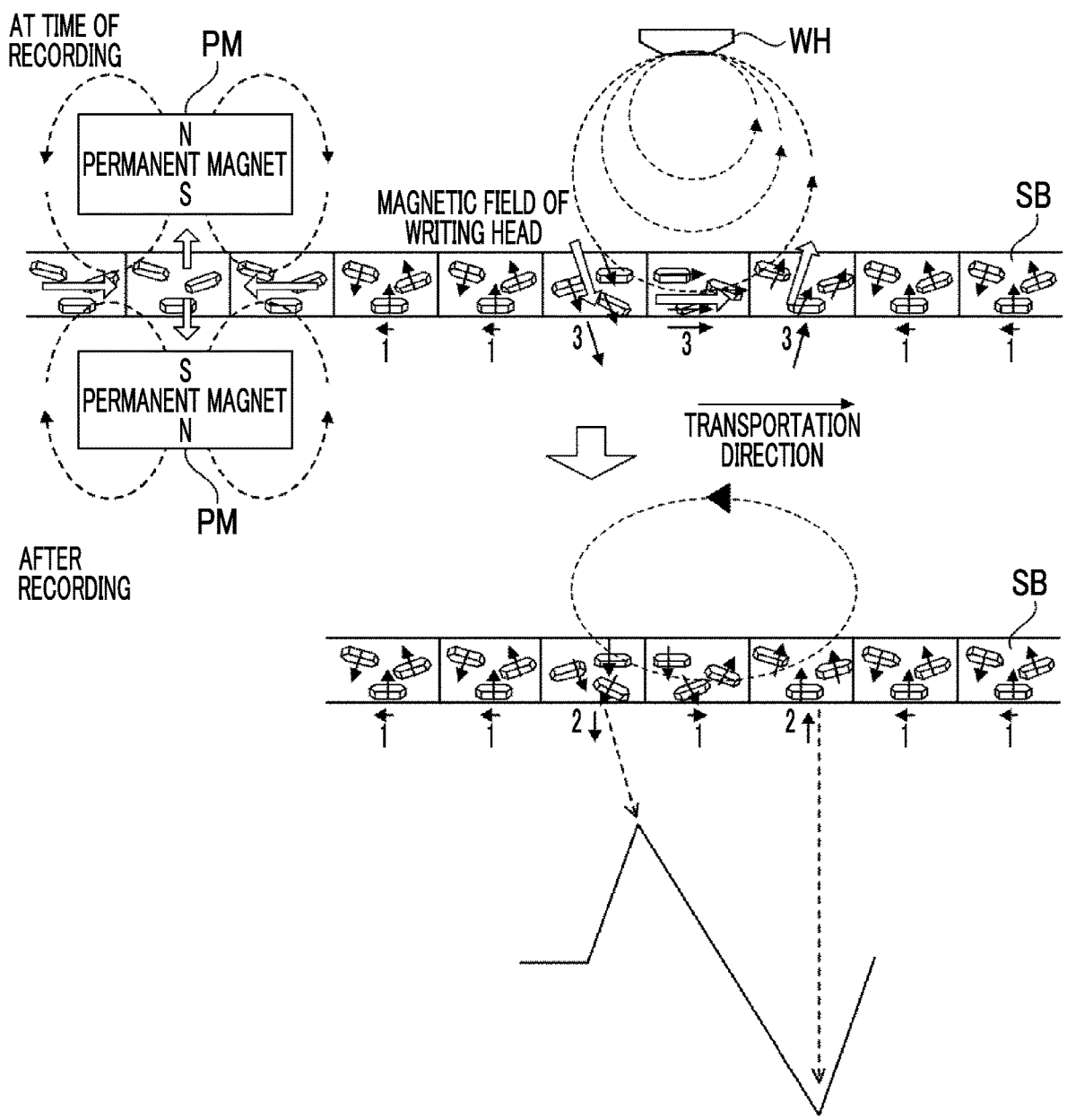
FIG. 12 is a diagram for describing a magnetization direction of the servo band.

Next, a magnetization direction of the servo band SB will be described with reference to FIG. 12. As shown in FIG. 12, the permanent magnet PM is provided on an upstream side of the magnetic tape MT in the transportation direction in the servo signal writing head WH. The servo band SB is magnetized with direct current in one direction (in the example of FIG. 12, direction opposite to the transportation direction of the magnetic tape MT) in the longitudinal direction of the servo band SB by a magnetic field of the permanent magnet PM, and accordingly, the magnetization direction is directed one direction.

After performing direct current magnetization by a magnetic field of the permanent magnet PM, the servo pattern SP is recorded on the servo band SB by the servo signal writing head WH. In this case, as shown in FIG. 12, the servo signal writing head WH is magnetized and records the linear pattern of the servo pattern SP in direction different from the magnetization direction of the servo band SB, by generating a circle-shaped magnetic field in which the magnetization direction is directed a predetermined direction (in example of FIG. 12, anticlockwise direction). That is, the magnetization direction of the first magnetization region SP1 and second magnetization region SP2 is directed a direction different from the magnetization direction of the servo band SB. The magnetization may be performed so that the magnetization direction of the first magnetization region SP1 and second magnetization region SP2 is directed the direction partially different from the magnetization direction of the servo band SB.

Accordingly, after recording the servo pattern SP, the magnetization direction of the end portion of the linear pattern of the servo pattern SP on the positive side and the magnetization direction of the end portion thereof on the negative side are directions different from each other and directions different from (direction orthogonal to, in the embodiment) the magnetization direction of the servo band SB. Therefore, in a case of reading the servo pattern SP recorded as described above by the servo signal readout element SRD, it is possible to detect the peak corresponding to the end portion of the linear pattern on the positive side and the peak corresponding thereto on the negative side with an excellent accuracy. As a result, it is possible to perform the positioning of the magnetic head H with an excellent accuracy. A shape of the magnetic field generated by the servo signal writing head WH is not limited to a circular shape, and may be an elliptical shape or a horseshoe shape.

Hereinabove, as described above, according to the embodiment, the width W satisfies Expression (1) or Expression (2) and the angle θ is greater than 25° and equal to or smaller than 45°. Therefore, it is possible to perform the positioning of the magnetic head H with an excellent accuracy.

According to the embodiment, the stripe interval P is 0.6 μm to 2.4 μm and the number of stripes is 6 to 14. Therefore, it is possible to perform the positioning of the magnetic head H with an excellent accuracy.

According to the embodiment, the magnetic powder is BaFe or SrFe and the volume of the particles of the magnetic powder is 900 nm$^3$ to 1,500 nm$^3$. Therefore, it is possible to perform the positioning of the magnetic head H with an excellent accuracy.

According to the embodiment, the information is embedded by making the number of stripes different from each other between one pair of servo patterns SP. Therefore, it is possible to read out information embedded in the servo signal with an excellent accuracy.

In the embodiment, a case of embedding information by making the number of stripes of the first magnetization region SP1 different from each other between the servo patterns SP has been described, but there is no limitation thereto. For example, the information may be embedded by making the number of stripes of the second magnetization region SP2 different from each other between the servo patterns SP. In addition, for example, the information may be embedded by making the number of stripes of both of the first magnetization region SP1 and the second magnetization region SP2 different from each other between the servo patterns SP.

For example, the information may be embedded by making the number of stripes different from each other between the first magnetization region SP1 and the second magnetization region SP2 in the servo pattern SP. In this case, as shown in the upper portion of FIG. 13 as an example, the "1" is allocated to a pair of servo patterns SP in which the number of stripes of the servo pattern SPA is 9 and the number of stripes of the servo pattern SPB is 8.

Figure 14:
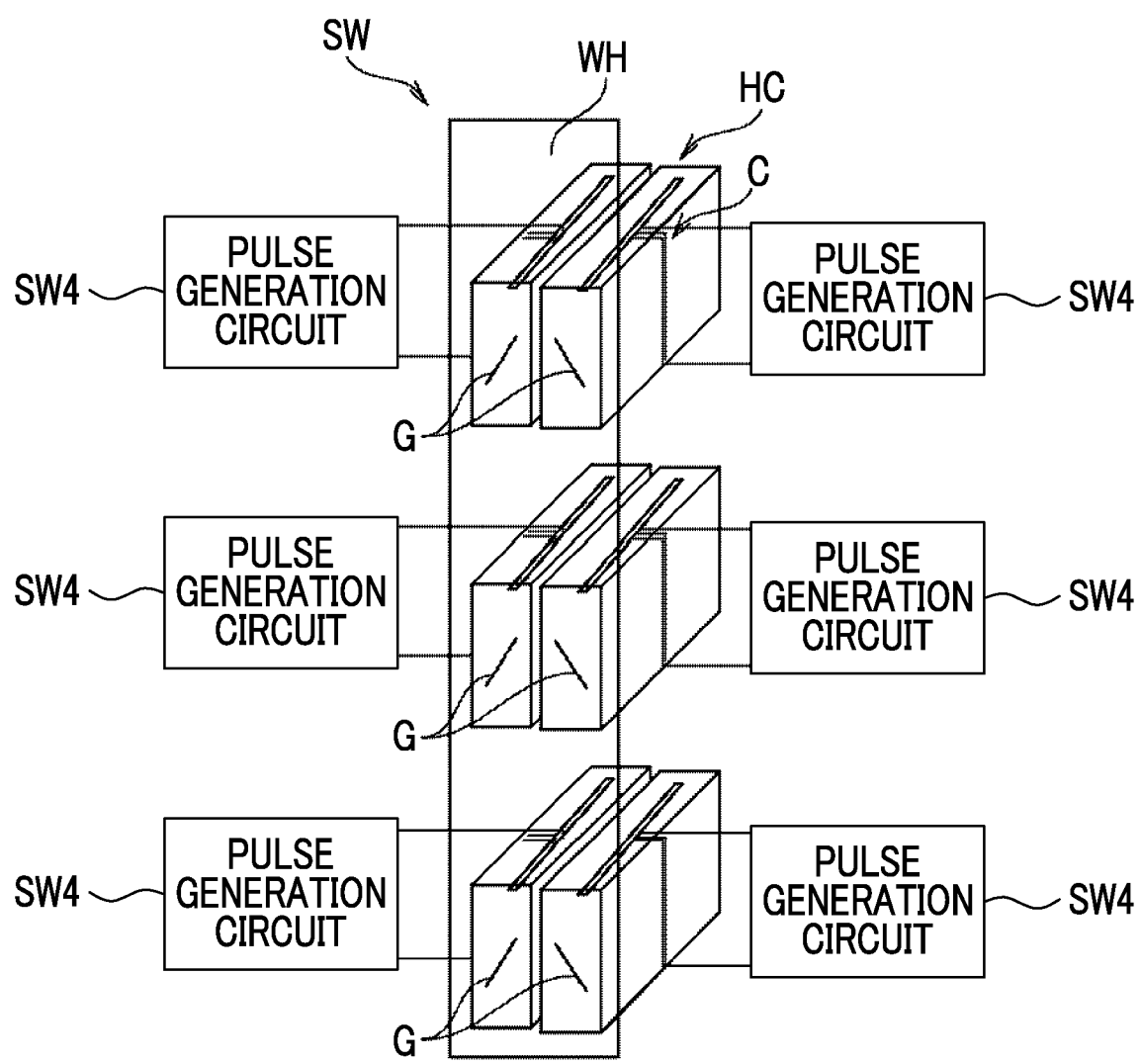
FIG. 14 is a diagram showing an example of the configuration of the servo writer.

In this case, as shown in the lower portion of FIG. 13, "0" is allocated to a pair of servo patterns SP in which the number of stripes of the first magnetization region SP1 of the servo pattern SPA is 9, the number of stripes of the second magnetization region SP2 is 8, and the number of stripes of the servo pattern SPB is 8. FIG. 14 shows an example of a configuration of the servo writer SW of this embodiment. Regarding the constituent elements of FIG. 14 which are same as those in FIG. 11B, the same reference numerals are used and the description thereof is omitted.

As shown in FIG. 14, in the servo writer SW of this embodiment, the head core HC is independent in one gap pattern G and the other gap pattern G In addition, each coil C is wound around each head core HC, and the pulse generation circuit SW4 which supplies the recording pulse current to each coil C is also independently provided. Therefore, it is possible to make the number of stripes different from each other between the first magnetization region SP1 and second magnetization region SP2 in the servo pattern SP.

"0" or "1" may not be allocated to one pair of servo patterns SP, and "0" or "1" may be allocated to one servo pattern SP.

What is claimed is:

1. A magnetic tape comprising:
servo patterns repeatedly formed in a longitudinal direction of a servo band, each of the servo patterns including a first magnetization region formed to be tilted with respect to a width direction of the servo band by an angle θ along the width direction of the servo band, and a second magnetization region not parallel to the first magnetization region along the width direction of the servo band,
wherein the magnetic tape is used in a recording and reproducing system that uses a reproducing element for reproducing the servo pattern, a width of the reproducing element satisfies W1≤(1/tanθ)×stripe width T of the servo pattern, and
the angle θ is greater than 25° and equal to or smaller than 45°.

2. The magnetic tape according to claim 1,
wherein at least one of a condition that the stripe interval of the servo pattern is 0.6 μm to 2.4 μm or a condition that the number of stripes in the first magnetization region and the second magnetization region is 6 to 14 is satisfied.

3. The magnetic tape according to claim 1, wherein the magnetic tape is used in a recording and reproducing system which uses the reproducing element for reproducing the servo pattern, the width of which satisfies W2≤(0.5/tanθ)× stripe width T of the servo pattern.

4. The magnetic tape according to claim 1, wherein a magnetic powder of the magnetic tape is strontium ferrite or barium ferrite.

5. The magnetic tape according to claim 4, wherein a volume of a particle of the magnetic powder is 900 nm³ to 1,500 nm³.

6. The magnetic tape according to claim 1,
wherein a magnetization direction is directed one direction by magnetizing the servo band with direct current in the predetermined one direction in a longitudinal direction, and
the magnetization direction of the first magnetization region and the second magnetization region is directed a direction different from or a direction partially different from the magnetization direction of the servo band.

7. A magnetic tape comprising:
servo patterns repeatedly formed in a longitudinal direction of a servo band, each including a first magnetization region formed to be tilted with respect to a width direction of the servo band by an angle θ along the width direction of the servo band, and a second magnetization region not parallel to the first magnetization region along the width direction of the servo band,
wherein the magnetic tape is used in a recording and reproducing system that uses a reproducing element for reproducing the servo pattern, a width of the reproducing element satisfies W1≤(1/tanθ)×stripe width T of the servo pattern, and at least one of a condition that the stripe interval of the servo pattern is 0.6 μm to 2.4 μm, or a condition that the number of stripes in the first magnetization region and the second magnetization region is 6 to 14 is satisfied.

8. The magnetic tape according to claim 7, wherein the angle θ is greater than 25° and equal to or smaller than 45°.

9. The magnetic tape according claim 7, wherein the magnetic tape is used in a recording and reproducing system which uses the reproducing element for reproducing the servo pattern, the width of which satisfies W2≤(0.5/tanθ)×stripe width T of the servo pattern.

10. The magnetic tape according to claim 7, wherein a magnetic powder of the magnetic tape is strontium ferrite or barium ferrite.

11. The magnetic tape according to claim 10, wherein a volume of a particle of the magnetic powder is 900 nm³ to 1,500 nm³.

12. The magnetic tape according to claim 7,
wherein a magnetization direction is directed one direction by magnetizing the servo band with direct current in the predetermined one direction in a longitudinal direction, and
the magnetization direction of the first magnetization region and the second magnetization region is directed a direction different from or a direction partially different from the magnetization direction of the servo band.

13. A manufacturing method of a magnetic tape in which servo patterns are repeatedly formed in a longitudinal direction of a servo band, each of the servo patterns including a first magnetization region formed to be tilted with respect to a width direction of the servo band by an angle θ along the width direction of the servo band, and a second magnetization region not parallel to the first magnetization region along the width direction of the servo band, the magnetic tape being used in a recording and reproducing system that uses a reproducing element for reproducing the servo pattern, a width of the reproducing element satisfies W1≤(1/tanθ)×stripe width T of the servo pattern, the method comprising:
recording the servo pattern on the servo band by setting the angle θ to be greater than 25° and equal to or smaller than 45°.

14. A manufacturing device of a magnetic tape, in which servo patterns are repeatedly formed in a longitudinal direction of a servo band, each of the servo patterns including a first magnetization region formed to be tilted with respect to a width direction of the servo band by an angle θ along the width direction of the servo band, and a second magnetization region not parallel to the first magnetization region along the width direction of the servo band, the magnetic tape being used in a recording and reproducing system that uses a reproducing element for reproducing the servo pattern, a width of the reproducing element satisfies W1≤(1/tanθ)×stripe width T of the servo pattern, the device comprising:
a recording unit that records the servo pattern on the servo band by setting the angle θ to be greater than 25° and equal to or smaller than 45°.

15. A manufacturing method of a magnetic tape, in which servo patterns are repeatedly formed in a longitudinal direction of a servo band, each of the servo patterns including a first magnetization region formed to be tilted with respect to a width direction of a servo band by an angle θ along the width direction of the servo band, and a second magnetization region not parallel to the first magnetization region along the width direction of the servo band, the magnetic tape being used in a recording and reproducing system that uses a reproducing element for reproducing the servo pattern, a width of the reproducing element satisfies W1≤(1/tanθ)×stripe width T of the servo pattern, the method comprising:
recording the servo pattern on the servo band by satisfying at least one of a condition that the stripe interval of the servo pattern is 0.6 μm to 2.4 μm, or a condition that the number of stripes in the first magnetization region and the second magnetization region is 6 to 14.

16. A manufacturing device of a magnetic tape, in which servo patterns are repeatedly formed in a longitudinal direction of a servo band, each of the servo patterns including a first magnetization region formed to be tilted with respect to a width direction of the servo band by an angle θ along the width direction of the servo band, and a second magnetization region not parallel to the first magnetization region along the width direction of the servo band, the magnetic tape being used in a recording and reproducing system that uses a reproducing element for reproducing the servo pattern, a width of the reproducing element satisfies W1≤(1/tanθ)×stripe width T of the servo pattern, the device comprising:
a recording unit that records the servo pattern on the servo band by satisfying at least one of a condition that the stripe interval of the servo pattern is 0.6 μm to 2.4 μm, or a condition that the number of stripes in the first magnetization region and the second magnetization region is 6 to 14.

17. A recording and reproducing system, comprising:
a magnetic head including a servo signal readout element that reads out a servo pattern recorded on a servo band of the magnetic tape according to claim 1, and a recording and reproducing element that performs at least one of recording or reproducing of data with respect to a data band of the magnetic tape; and
a control unit which performs positioning of the magnetic head along a width direction of the magnetic tape, in accordance with an interval of a detection of the servo pattern performed by the servo signal readout element, in a case of performing at least one of recording or reproducing of data with respect to the data band.

18. A recording and reproducing system, comprising:

a magnetic head including a servo signal readout element that reads out a servo pattern recorded on a servo band of the magnetic tape according to claim 7, and a recording and reproducing element that performs at least one of recording or reproducing of data with respect to a data band of the magnetic tape; and a control unit which performs positioning of the magnetic head along a width direction of the magnetic tape, in accordance with an interval of a detection of the servo pattern performed by the servo signal readout element, in a case of performing at least one of recording or reproducing of data with respect to the data band.

* * * * *